Jan. 17, 1939.  T. C. E. ROWLAND ET AL  2,144,086
VEHICLE BRAKE
Filed March 13, 1937   4 Sheets-Sheet 1
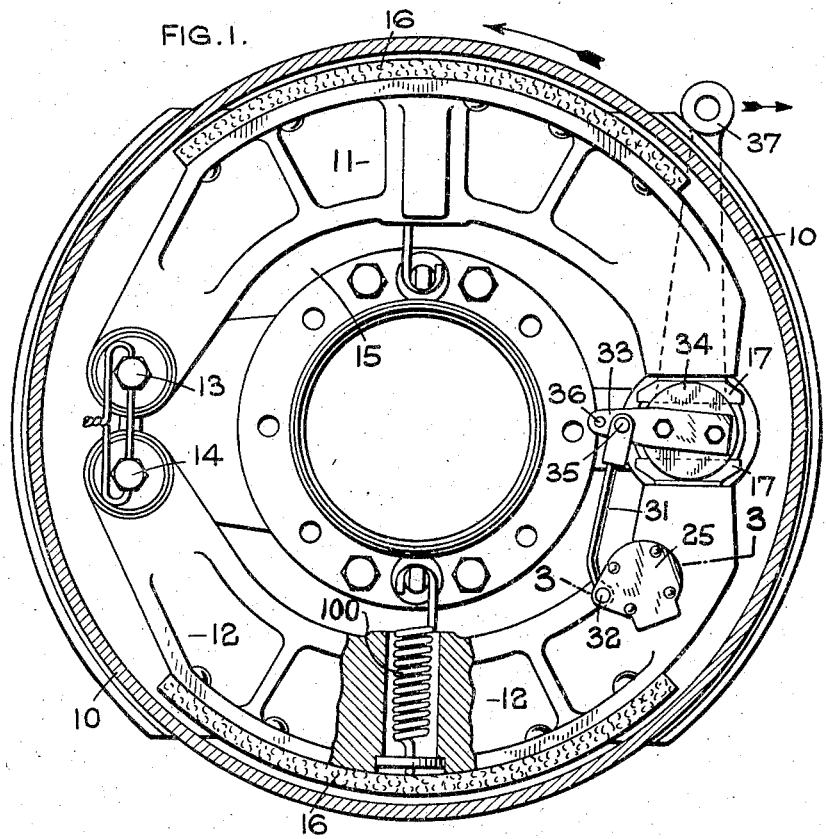
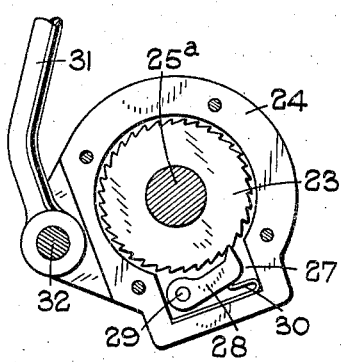
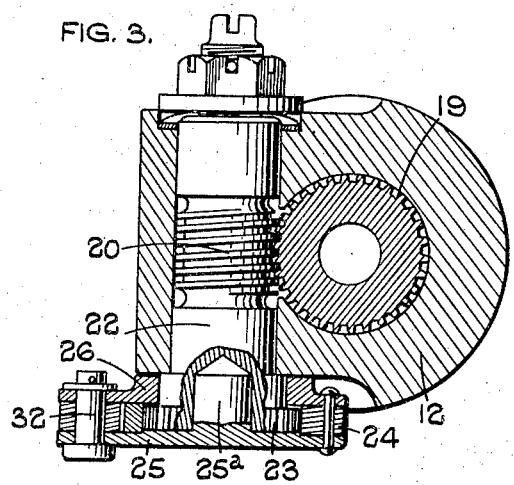
Thomas Carlyle Ellison Rowland
Harry Parker   applicants Jan. 17, 1939.　　T. C. E. ROWLAND ET AL　　2,144,086
VEHICLE BRAKE
Filed March 13, 1937　　4 Sheets-Sheet 2

Thomas Carlyle Ellison Rowland
Harry Parker　Applicants

Attys.

Thomas Carlyle Ellison Rowland
Harry Parker
Applicants

Jan. 17, 1939.　　T. C. E. ROWLAND ET AL　　2,144,086
VEHICLE BRAKE
Filed March 13, 1937　　4 Sheets-Sheet 4

Thomas Carlyle Ellison Rowland
Harry Parker
Applicants.
Taulmin & Taulmin
Attys.

Patented Jan. 17, 1939

2,144,086

UNITED STATES PATENT OFFICE

2,144,086

VEHICLE BRAKE

Thomas Carlyle Ellison Rowland, Solihull, and Harry Parker, King's Heath, Birmingham, England Application March 13, 1937, Serial No. 130,780
In Great Britain August 4, 1936

9 Claims. (Cl. 188—79.5)

This invention relates to vehicle brakes in which one or more brake shoes is or are acted upon by a cam or other actuating member to move it or them into contact with the brake drum, apparatus being provided whereby wear of the friction lining material on said shoe or shoes is automatically compensated for.

The invention has particular reference to automatic adjusting apparatus of the kind wherein the working clearance between the brake shoe or shoes and the drum is determined by means of a movable abutment associated with said shoe or with each shoe, and wherein said abutment is adjusted by screw-and-nut or other mechanism which is automatically operated, when the amount of shoe travel required to apply the brake becomes excessive, in a manner to reduce the travel necessary.

In the specification of Letters Patent No. 2,049,628, granted to us August 4th, 1936, we have described and shown apparatus of the above kind in which worm reduction gearing is interposed between the adjusting mechanism and the operating means therefor, such means including a ratchet wheel mounted on the worm shaft and actuated by means of a rack pivoted to a stationary part of the brake, which rack acts as a pawl.

One object of the present invention is to provide an improved apparatus which allows of a much greater movement being obtained between the driving and driven parts of the operating means. This enables a ratchet wheel having coarser teeth to be used and the driving member may be in the form of a pawl which is loaded by a spring more lightly than was necessary in the case of the rack previously used.

In the arrangement according to our prior specification, it was found desirable to use two ratchet wheels side by side with their teeth staggered. Another object of the present invention is to enable equally satisfactory results to be obtained with a single ratchet wheel, and to permit the operating means to be adjusted as regards the stroke of the driving member thereof.

Further objects are to provide a construction of apparatus for whose assembly no great skill is necessary, and in which the moving parts are effectually protected from moisture and dirt.

Referring to the drawings:—

Figure 1 is a sectional view in side elevation showing one form of the invention.

Figure 2 is a view upon an enlarged scale showing the form of one way drive used in this construction.

Figure 3 is a section on line 3—3 of Figure 1.

Figure 4:
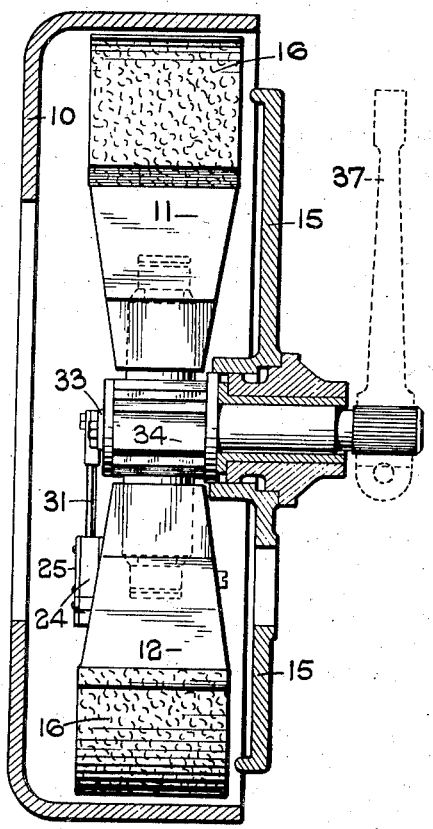
Figure 4 is a sectional view in end elevation of the construction shown in Figures 1 to 3.
Figure 5:
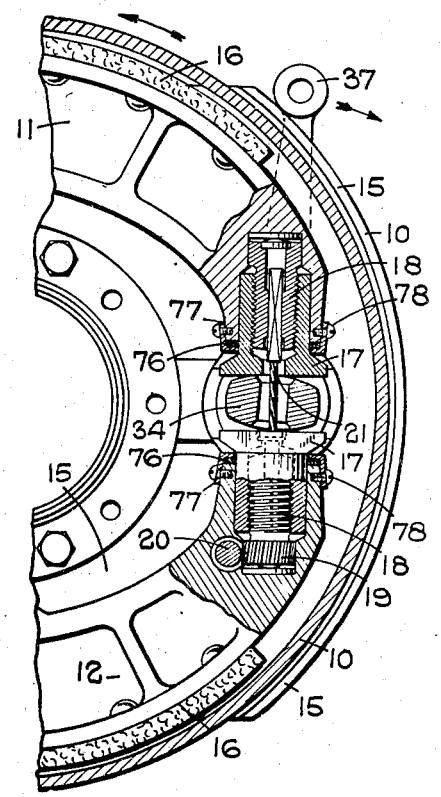
Figure 5 is a section on line 5—5 of Figure 4.

In the construction shown in Figures 1 to 5 a brake drum is shown at 10 and this contains brake shoes 11 and 12, pivoted respectively at 13 and 14 to a stationary back plate 15, each shoe being normally held clear of the drum by means of a spring 100.

Each brake shoe has a friction lining 16 thereon, and means hereinafter to be described are provided for automatically adjusting the shoes 11, 12 towards the drum 10 as the linings 16 wear thinner, so that the clearance between the linings 16 and the drum 10 in the inoperative position of the shoes 11, 12 is maintained substantially constant.

In the construction illustrated in Figures 1 to 5 each of the shoes is provided with a movable abutment 17 adapted to be moved outwardly from the end of the shoe by means of a screw 18.

The screw 18 which is situated in the shoe 12, carries a worm wheel 19 meshing with a worm 20 on a worm spindle 22 extending transversely through the shoe. The two screws 18 are mechanically coupled together by the member 21 so that an endwise movement of the abutment associated with the shoe 12 is accompanied by a corresponding movement, in the opposite direction, of the abutment associated with the shoe 11. Between the two abutments 17 the actuating cam 34 operates. This cam is mounted in a bearing in the back plate 15 and it can be turned by an operating lever 37.

This mechanism need not be described in greater detail, as it corresponds with that described and shown in the prior specification to which we have referred.

The worm 20 projects from the side of the shoe 12 and is there formed or provided with a ratchet wheel 23 the teeth of which, in the present construction, co-operate with a pawl 28 or the equivalent mounted for oscillatory movement about the axis of the wheel 22.

This pawl 28 may be enclosed in and carried by a housing which comprises a ring 24, an end plate 25, and an inner plate 26, these three parts being secured together to form a unit. The inner plate 26 is provided with a central opening which receives and fits the worm shaft 22, and the end plate 25 has a central spigot 25a which engages a recess in the end of said shaft. The ring 24 is recessed internally as shown at 27 to accommodate the pawl 28 pivoted at 29 and acted upon by a spring 30. This pawl engages with the teeth of the ratchet wheel 23.

It will be seen from Figure 2 that the ratchet wheel 23 is turned by an angular movement of the housing 24, 25, 26 in a contra-clockwise direction, but is not affected by a clockwise movement of the housing, the pawl 28 merely riding over the teeth of the wheel 23. The housing aforesaid is mechanically coupled to an arm 33 fixed to the cam 34, the connection taking the form of a link 31 which is pivoted to the housing at 32 and to the arm at 35. The lever 33 may be provided with a plurality of holes, one of which can be seen at 36, so that the point of connection between the link 31 and the lever 33 can be adjusted so that either more or less oscillatory movement is imparted to the housing 24, 25, 26 for a given movement of the cam 34. This provides a convenient means whereby the working clearance between the brake linings 16 and the drum 10 can be adjusted.

Figure 6:
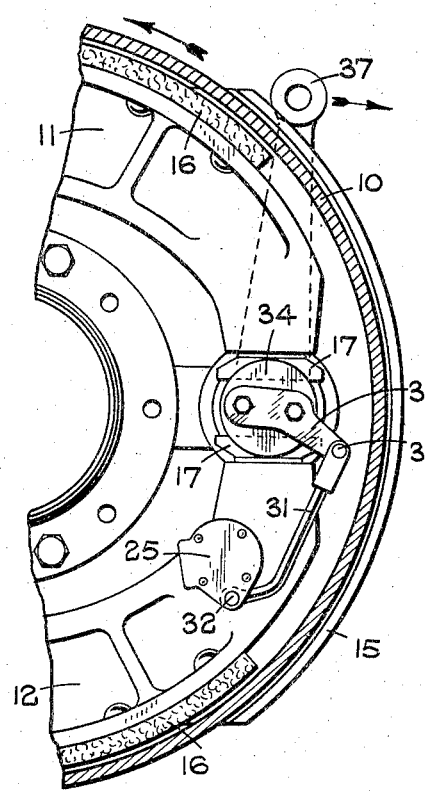
Figure 6 is a sectional view in side elevation showing a modification.

The construction shown in Figure 6 is similar to that shown in Figures 1 to 5, with the exception that in this case the lever 33 associated with the cam projects outwardly towards the circumference of the brake drum instead of inwardly towards the centre, and the point of connection 32 between the link 31 and the one-way drive is now on the outer side of the latter.

Figure 7:
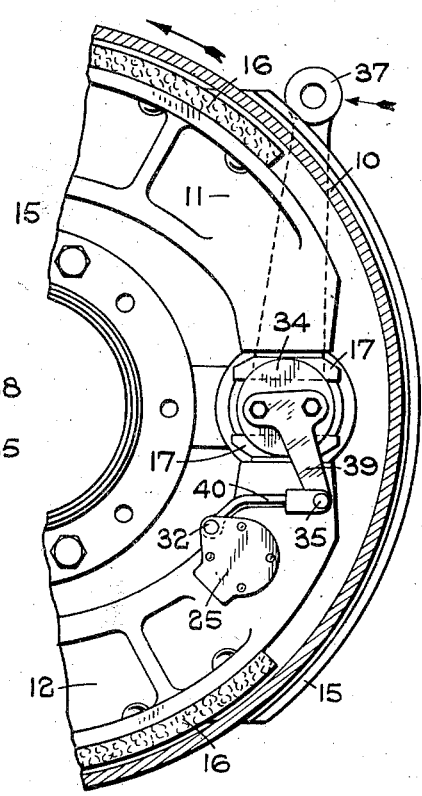
Figure 7 is a sectional view in side elevation showing a further modification.

The arrangement shown in Figure 7 resembles that of Figure 6, except insofar as the link 40 connected to the arm 39 or the cam 34 extends to the inner side of the housing 24, 25, 26.

In the operation of the brake, the shoes 11, 12 are expanded against the drum 10 by rotation of the cam 34, so that the operating means for the adjustment device is moved bodily away from the centre of the cam. The housing 24, 25, 26 is thus moved angularly in relation to, and concentrically of, the ratchet wheel 23.

No movement of the worm shaft 22 takes place, however, unless the relative movement between the wheel 23 and the pawl 28 carried by the housing exceeds the length of one of the ratchet teeth.

When, owing to the state of wear of the brake linings, the movement of the shoes 11, 12 in applying the brake is sufficient to cause the pawl 28 to override a tooth of the wheel 23, rotary movement of the worm shaft 22 takes place on the return movement of the shoes, so that a similar movement of both abutments 17 is made, as described in our prior U. S. A. specification No. 2,049,628.

Figure 8:
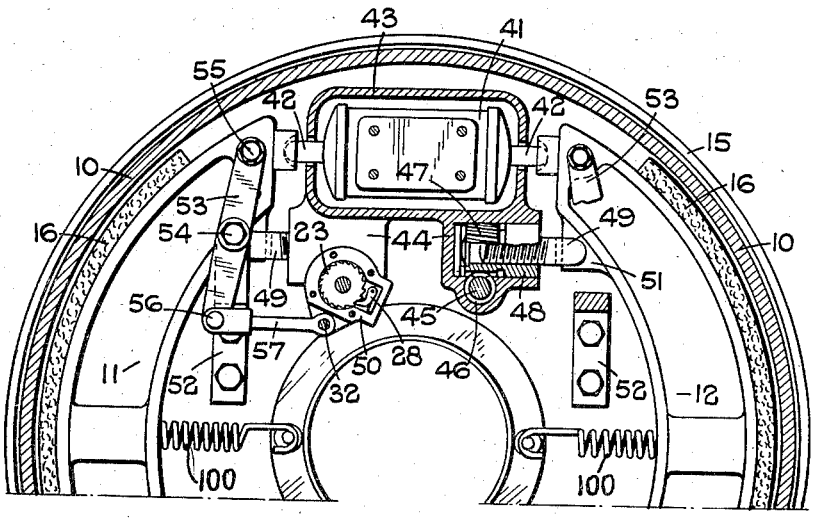
Figure 8 is a sectional view in side elevation showing our present invention applied to a brake actuated by fluid pressure.

In the construction shown in Figure 8 a modification is shown in which our improved apparatus is applied to a brake which is operated by fluid pressure. In this case a fluid cylinder 41 is provided, in the ends of which there are pistons, each piston having a rod 42, the two rods 42 acting on the ends of the brake shoes 11 and 12, the arrangement being such that when it is desired to apply the brake fluid is forced into the cylinder between the pistons so that they are forced outwardly and consequently turn the brake shoes on their pivots.

The cylinder 41 is carried by a fixed bracket having a part 43 which extends partly around the cylinder and this fixed bracket is formed with a pair of housings 44, each housing containing mechanism which corresponds substantially to the brake adjusting mechanism described in our prior U. S. A. specification No. 2,049,628. In each housing there is a worm shaft 45 on which is a worm 46 driving a worm wheel 47 on a sleeve 48, the sleeve being threaded internally and containing a screw 49 engaging the said thread. Means are provided for locating the sleeve 48 against endwise movement, so that when it is turned the screw 49 is moved outwardly.

The shaft 45 is adapted to be driven by a one-way drive device 50 which may be constructed substantially as shown in Figures 2 and 3. The outer ends of the screws 49 are forked and each engages over a web 51 formed on one of the brake shoes.

The stationary back plate of the brake is provided with a pair of brackets 52 upon each of which is pivoted a lever 53 at 54. One arm of each lever is pivotally connected at 55 to one end of a brake shoe and the other arm of the same lever is pivotally connected at 56 to a link 57 forming a mechanical connection between the lever and the one-way drive device. The one-way drive devices are, therefore, driven from the brake shoes in this construction. When the clearance between the brake lining and the circumference of the brake drum is normal, the movement imparted to each one-way drive device is insufficient to cause the pawl 28 to ride over a tooth, but as soon as the movement at either shoe becomes excessive, the pawl engages a fresh tooth, so that on the return movement the worm shaft 45 is given a partial rotation, thus advancing the screw 49 and automatically reducing the clearance between the brake lining and the brake drum.

It will be clear that the link 57 can be connected at any point along the arm of the lever 53, so that the amount of movement imparted to the one-way drive device at each operation can be anything that may be desired. In fact, this movement can be set in accordance with the clearance desired between the brake lining and the brake drum.

When an adjustment occurs in this construction the shoe which has been adjusted is prevented by the screw 49 from coming back beyond a certain distance, so that the piston in the cylinder 41 associated with this particular shoe will not be pushed so far inwardly in the cylinder. Means are provided in the hydraulic system to keep the cylinder full of fluid.

Figure 9:
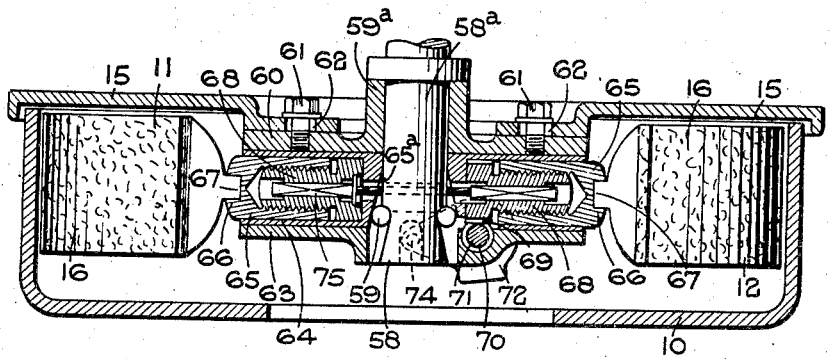
Figure 9 is a sectional plan view showing our invention as applied to a brake operated by a sliding member.

In the construction shown in Figure 9 our invention is shown applied to a well-known type of brake wherein, to apply the brake, adjacent ends of the brake shoes are forced apart by means of a wedge 58 acting through rollers 59 upon the slides which engage adjacent ends of the brake shoes.

In the construction shown in Figure 9 the brake shoes are shown at 11 and 12 and the brake drum is shown at 10. The stationary back plate is shown at 15 and the operating shaft of the wedge 58 is mounted in a bearing 58a formed in a plate 60. This plate 60 is a floating plate and it is provided with studs 61 which extend through slots 62 in the back plate 15, the arrangement being such that the plate 60 carrying the shaft 58a is capable of a limited sliding movement across the back plate 15. This motion is desirable owing to unequal wear of the linings of the two brake shoes. If wear for the two linings is desired, then the plate 60 may be formed integrally with or fixed to the plate 15. The slots 62 are, of course, parallel to the movement produced by the wedge 58.

In applying our invention to this type of brake, apparatus corresponding essentially with that described in our prior U. S. A. specification No. 2,049,628 is mounted so as to function between the wedge and the ends of the brake shoes. The plate 60 is formed with two tubular guides 63 in each of which is mounted a sleeve 64 having an inclined end 65a adapted to be operated upon by the rollers 59.

Within each sleeve 64 is a hollow stud 65, the outer end of which is recessed as shown at 66 and engages a trunnion 67 on one of the brake shoes. Each of these studs is arranged to move in an endwise direction, but is prevented from rotation by suitable means.

The interior of each stud 65 is screw threaded and engaged by a screw 68. In the one case the screw is provided with a worm wheel 69 adapted to be operated by a worm 70 on a worm shaft 71. The worm shaft is adapted to be operated by a one-way drive device 72 which may be constructed similarly to that illustrated in Figures 2 and 3. The one-way drive device is pivotally connected at 74 to the wedge member 58, the arrangement being such that, when the clearance between the brake linings and the brake drum is normal the one-way drive device does not move far enough to impart any motion to the worm shaft 71, but when the clearance between the brake linings and the brake drum becomes excessive then there is sufficient movement of the wedge member 58 to cause the one-way drive device to impart rotary motion to the worm shaft 71, so as to rotate the screw 68 which in turn imparts endwise movement to the stud 65.

The two screws 68 are mechanically coupled together by a member 75 constructed in accordance with our prior U. S. A. specification No. 2,049,628.

Owing to the fact that in this type of brake the lining of one brake shoe always wears faster than the other, the pitch of the one screw 68 which is directly driven from the one-way drive device may be considerably greater than the pitch of the other screw 68. Thus, with an equal amount of rotational movement, one screw will produce considerably more adjustment than the other screw. By employing such an arrangement, the lateral movement of the shaft 58a may be kept down to a minimum.

In all the various constructions described, the screw and nut mechanism and a worm spindle may be protected against the effects of rain, water and dirt by providing a washer such as 76 (see Figure 5), this washer being retained in place by a thin metal ring 77 held in place by screws 78.

We claim:

1. In a vehicle brake, the combination of a fixed support, a rotating drum, a shoe pivoted at one end to said support, a friction lining on said shoe, means for applying pressure to said shoe to move it into contact with said drum, pull-off means for moving said shoe into an inoperative position when said pressure is relaxed, an adjustment device whereby the inoperative position of said shoe may be advanced towards said drum to compensate for wear of said friction lining, operating means for said adjustment device, a mechanical connection between said operating means and a part of the brake other than that on which said operating means as a whole is mounted, said connection being so arranged that said operating means is actuated by relative motion of said operating means as a whole and said other part of the brake when said shoe is brought into contact with said drum, such actuation of said operating means being adapted, in the event of the amount of shoe travel required to apply the brake becoming excessive, to cause uni-directional movement of said adjustment device in a manner to reduce the travel necessary, means for varying the degree of actuation of said operating means required to produce a given movement of said adjustment device, and reduction gearing interposed between said adjustment device and the operating means therefor.

2. In a vehicle brake, the combination of a fixed support, a rotating drum, a shoe pivoted at one end to said support, a friction lining on said shoe, means for applying pressure to said shoe to move it into contact with said drum, pull-off means for moving said shoe into an inoperative position when said pressure is relaxed, an adjustment device whereby the inoperative position of said shoe may be advanced towards said drum to compensate for wear of said friction lining, operating means for said adjustment device comprising driving and driven elements angularly movable about a common centre, a coupling member connected to said driving element at a position offset from the centre thereof and also connected to a part of the brake other than that on which said operating means as a whole is mounted, said coupling member being so arranged that relative motion of said operating means as a whole and said other part of the brake, during pivotal movement of said shoe, causes an angular movement of said driving element about its centre, such angular movement of said driving element being adapted to cause uni-directional rotation of said driven element whereby, in the event of the amount of shoe travel required to apply the brake becoming excessive, said adjustment device is moved in a manner to reduce the travel necessary, means for varying the amount of angular movement of said driving element required to produce a given movement of said adjustment device, and reduction gearing interposed between said adjustment device and the operating means therefor.

3. In a vehicle brake, the combination of a fixed support, a rotating drum, a shoe pivoted at one end to said support, a friction lining on said shoe, means for applying pressure to said shoe to move it into contact with said drum, pull-off means for moving said shoe into an inoperative position when said pressure is relaxed, an adjustment device whereby the inoperative position of said shoe may be advanced towards said drum to compensate for wear of said friction lining, operating means for said adjustment device comprising a ratchet wheel, a pawl or the equivalent engaging with said ratchet wheel, and a member carrying said pawl and mounted for angular movement concentrically of said ratchet wheel, a coupling member connected to said pawl-carrying member at a position offset from the centre thereof and also connected to a part of the brake other than that on which said operating means as a whole is mounted, said coupling member being so arranged that relative motion of said operating means as a whole and said other part of the brake during pivotal movement of said shoe causes an angular movement of said pawl-carrying member around said ratchet wheel, such angular movement of said pawl-carrying member being adapted to cause uni-directional rotation of said ratchet wheel whereby, in the event of the amount of shoe travel required to apply the brake becoming excessive, said adjustment device is moved in a manner to reduce the travel necessary, means for varying the amount of angular movement of said pawl-carrying member required to produce a given movement of said adjustment device, and reduction gearing interposed between said adjustment device and the operating means therefor.

4. In a vehicle brake, the combination of a fixed support, a rotating drum, a shoe pivoted at one end to said support, a friction lining on said shoe, means for applying pressure to said shoe to move it into contact with said drum, a pivoted arm adapted for angular movement in accordance with the pivotal movement of said shoe, pull-off means for moving said shoe into an inoperative position when said pressure is relaxed, an adjustment device whereby the inoperative position of said shoe may be advanced towards said drum to compensate for wear of said friction lining, operating means for said adjustment device comprising driving and driven elements angularly movable about a common centre, a lever arm or the equivalent carried by said driving element and movable therewith, a coupling member connecting said pivoted arm to said lever arm so that relative motion of said pivoted arm and said operating means as a whole during pivotal movement of said shoe causes an angular movement of said driving element about its centre, such angular movement of said driving element being adapted to cause uni-directional rotation of said driven element whereby, in the event of the amount of shoe travel required to apply the brake becoming excessive, said adjustment device is moved in a manner to reduce the travel necessary, means for adjusting longitudinally of one of said arms the point of connection thereto of said coupling member, and reduction gearing interposed between said adjustment device and the operating means therefor.

5. In a vehicle brake, the combination of a fixed support, a rotating drum, a shoe pivoted at one end to said support, a friction lining on said shoe, a rotatable member for moving said shoe into contact with said drum, an arm fixed to said shoe-moving means and formed with a plurality of spaced holes along the length thereof, pull-off means for moving said shoe into an inoperative position when said pressure is relaxed, an adjustment device whereby the inoperative position of said shoe may be advanced towards said drum to compensate for wear of said friction lining, means mounted on said shoe for operating said adjustment device and comprising driving and driven elements angularly movable about a common centre, a coupling member having one end attached to said driving element at a position offset from the centre thereof, a pin passing through the other end of said coupling member and engageable selectively with the holes in said arm, whereby relative movement of said arm and said operating means as a whole during pivotal movement of said shoe causes an angular movement of said driving element about its centre, such angular movement of said driving element being adapted to cause uni-directional rotation of said driven element whereby, in the event of the amount of shoe travel required to apply the brake becoming excessive, said adjustment device is moved in a manner to reduce the travel necessary, and reduction gearing interposed between said adjustment device and the operating means therefor.

6. In a vehicle brake, the combination of a fixed support, a rotating drum, a shoe pivoted at one end to said support, a friction lining on said shoe, means for applying pressure to said shoe to move it into contact with said drum, pull-off means for moving said shoe into an inoperative position when said pressure is relaxed, an adjustment device whereby the inoperative position of said shoe may be advanced towards said drum to compensate for wear of said friction lining, operating means for said adjustment device comprising a rotary ratchet element and an element mounted for angular movement concentrically of said ratchet element, said concentrically-mounted element carrying a pawl which engages with said ratchet element and completely enclosing both said ratchet element and said pawl, a coupling member connected to one of said elements at a position offset from the centre thereof and also connected to a part of the brake other than that on which said operating means as a whole is mounted, said coupling member being so arranged that relative motion of said operating means as a whole and said other part of the brake during pivotal movement of said shoe causes an angular movement of said last-mentioned element about its centre, such angular movement of said last-mentioned element being adapted to cause uni-directional rotation of the other of said elements whereby, in the event of the amount of shoe travel required to apply the brake becoming excessive, said adjustment device is moved in a manner to reduce the travel necessary, and reduction gearing interposed between said adjustment device and the operating means therefor.

7. In a vehicle brake, the combination of a fixed support, a rotating drum, a shoe pivoted at one end to said support, a friction lining on said shoe, means for applying pressure to said shoe to move it into contact with said drum, pull-off means for moving said shoe into an inoperative position when said pressure is relaxed, an adjustment device whereby the inoperative position of said shoe may be advanced towards said drum to compensate for wear of said friction lining, operating means for said adjustment device comprising a pawl, a ratchet wheel mounted on a spindle and engaging with said pawl, and a housing completely enclosing said ratchet wheel and said pawl, said housing being centred on said spindle and having said pawl pivoted thereto, a coupling member connected to said housing at a position offset from the centre of said ratchet wheel and also connected to a part of the brake other than that on which said operating means as a whole is mounted, said coupling member being so arranged that relative motion of said operating means as a whole and said other part of the brake during pivotal movement of said shoe causes an angular movement of said housing upon said spindle, such angular movement of said housing being adapted to cause uni-directional rotation of said ratchet wheel whereby, in the event of the amount of shoe travel required to apply the brake becoming excessive, said adjustment device is moved in a manner to reduce the travel necessary, and reduction gearing interposed between said adjustment device and the operating means therefor.

8. In a vehicle brake, the combination of a fixed support, a rotating drum, a shoe pivoted at one end to said support, a friction lining on said shoe, means for applying pressure to said shoe to move it into contact with said drum, pull-off means for moving said shoe into an inoperative position when said pressure is relaxed, an adjustment device whereby the inoperative position of said shoe may be advanced towards said drum to compensate for wear of said friction lining, operating means for said adjustment device comprising a ratchet wheel mounted on a spindle, a ring embracing said ratchet wheel, plates secured to opposite sides of said ring and forming in conjunction therewith a housing which completely encloses said ratchet wheel, said spindle passing through and fitting an aperture in one of said plates, and a pawl disposed wholly within said housing and pivoted thereto for co-operation with said ratchet wheel, a coupling member connected to said housing at a position offset from the centre of said ratchet wheel and also connected to a part of the brake other than that on which said operating means as a whole is mounted, said coupling member being so arranged that relative motion of said operating means as a whole and said other part of the brake during pivotal movement of said shoe causes an angular movement of said housing upon said spindle, such angular movement of said housing being adapted to cause uni-directional rotation of said ratchet wheel whereby, in the event of the amount of shoe travel required to apply the brake becoming excessive, said adjustment device is moved in a manner to reduce the travel necessary, and reduction gearing interposed between said adjustment device and the operating means therefor.

9. In a vehicle brake, the combination of a fixed support, a rotating drum, a shoe pivoted at one end to said support, a friction lining on said shoe, means for applying pressure to said shoe to move it into contact with said drum, pull-off means for moving said shoe into an inoperative position when said pressure is relaxed, an adjustment device whereby the inoperative position of said shoe may be advanced towards said drum to compensate for wear of said friction lining, operating means for said adjustment device comprising a ratchet wheel mounted on a spindle, a ring embracing said ratchet wheel, a plate secured to one side of said ring and having an aperture therein which receives and fits said spindle, a second plate secured to the other side of said ring, the two plates and said ring together forming a housing which completely encloses said ratchet wheel, a spigot on said second plate which engages an axial recess in said spindle, a pawl disposed wholly within said housing and pivoted thereto for co-operation with said ratchet wheel, and opposed lugs on said plates extending beyond the periphery of said ring, a coupling member having one end pivoted to said housing between said opposed lugs and having its other end connected to a part of the brake other than that on which said operating means as a whole is mounted, said coupling member being so arranged that relative motion of said operating means as a whole and said other part of the brake during pivotal movement of said shoe causes an angular movement of said housing upon said spindle, such angular movement of said housing being adapted to cause uni-directional rotation of said ratchet wheel whereby, in the event of the amount of shoe travel required to apply the brake becoming excessive, said adjustment device is moved in a manner to reduce the travel necessary, and reduction gearing interposed between said adjustment device and the operating means therefor.

THOMAS CARLYLE ELLISON ROWLAND.
HARRY PARKER.